United States Patent [19]
Sato

[11] Patent Number: 6,011,544
[45] Date of Patent: Jan. 4, 2000

[54] COMPUTER SYSTEM WHICH INHIBITS INPUT OPERATION FROM KEYBOARD WHEN NECESSARY

[75] Inventor: Shigenobu Sato, Iruma, Japan

[73] Assignee: Kabushiki Kaisha Toshiba, Kawasaki, Japan

[21] Appl. No.: 08/951,049

[22] Filed: Oct. 15, 1997

[30] Foreign Application Priority Data

Dec. 26, 1996 [JP] Japan ..................................... 8-347429

[51] Int. Cl.$^7$ ...................................................... G09G 5/00
[52] U.S. Cl. ........................ 345/168; 345/156; 345/903; 361/680; 361/681; 364/708.1; 235/61 R
[58] Field of Search .................... 345/168, 903, 345/904, 905, 156; 235/61 R; 361/680, 681; 364/708.1

[56] References Cited

U.S. PATENT DOCUMENTS

| | | | |
|---|---|---|---|
| 4,372,694 | 2/1983 | Bovio et al. ............................. | 364/708 |
| 4,667,299 | 5/1987 | Dunn ........................................ | 364/708 |
| 5,148,153 | 9/1992 | Haymond ................................ | 345/168 |
| 5,754,395 | 5/1998 | Hsu et al. ................................ | 361/680 |

*Primary Examiner*—Bipin Shalwala
*Assistant Examiner*—Kent Chang
*Attorney, Agent, or Firm*—Finnegan, Henderson, Farabow, Garrett & Dunner, L.L.P.

[57] ABSTRACT

When coordinate data are entered from a tablet with a pen, the pen is operated on the tablet while depressing a predetermined key of a keyboard. A signal generated by the depression of the predetermined key is supplied to a keyboard controller. Upon reception of the signal, the keyboard controller stops sending key code data entered from the keyboard to an input/output controller. In this manner, undesirable data entry due to the improper operation of the keyboard is prevented when coordinate data are entered with the pen.

1 Claim, 5 Drawing Sheets

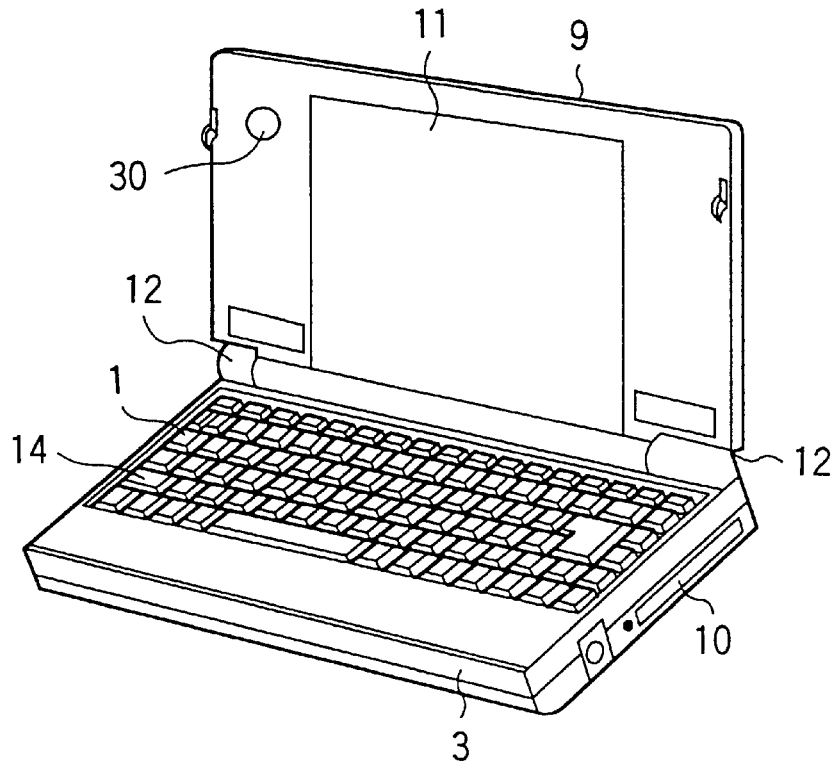
F I G. 3
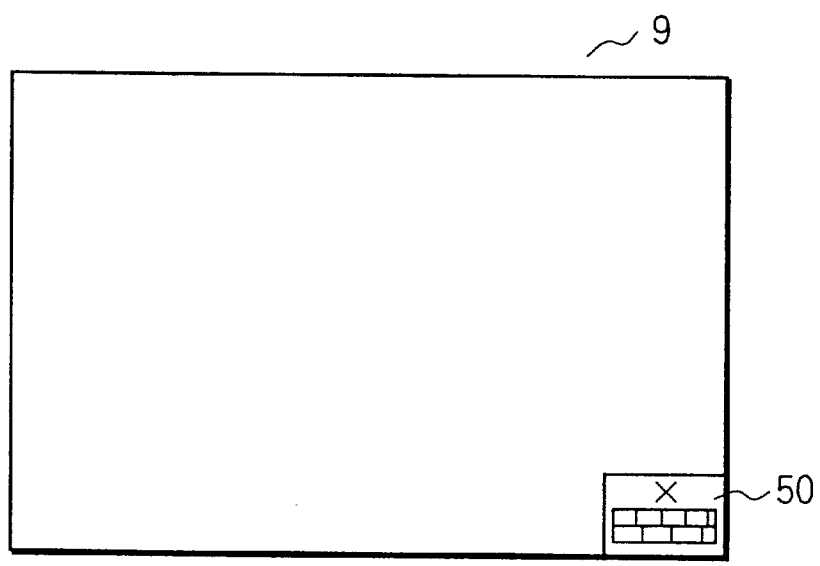
F I G. 5

COMPUTER SYSTEM WHICH INHIBITS INPUT OPERATION FROM KEYBOARD WHEN NECESSARY

BACKGROUND OF THE INVENTION

The present invention relates to a portable computer which comprises a keyboard and in which a coordinate input device and a display device are integrally formed as one body. More specifically, the present invention relates to a computer system comprising a means for inhibiting an input operation from the keyboard when necessary.

The personal computers recently developed include small-sized computers which are light in weight and improved in portability. Normally, such small-sized computers comprise not only a keyboard but also other types of data input devices, such as a pointing device (e.g., a mouse) and a tablet-type input device.

The tablet-type input device comprises a liquid crystal display (LCD) normally used as a display device, and a tablet assembled integrally with the liquid crystal display. Data are entered from the tablet-type input device by moving a pen or the like on the screen of the LCD. The tablet-type input device is advantageous in many respects. For example, a character or letter written on the screen with the pen can be recognized and entered as text data.

Even a computer comprising a tablet-type input device is provided with a keyboard (which is a standard type data input device). Therefore, the user can selectively use either the tablet-type input device or the keyboard, depending upon the circumstances. For example, the user will use the tablet-type input device when a character string should be entered with the pen to make notes of a something, and will use the keyboard when instructions of application software program should be entered.

As mentioned above, a small-sized computer employs not only a keyboard but also a tablet-type input device, for entering data. In general, a small-sized computer, particularly a portable computer, is designed in such a manner that it can be used not only on a steady desk but also in a train or a room where there is no desk or table. This being so, when the user enters data from the tablet-type input device by use of a pen, it is likely that the user's hand will touch the keys of the keyboard, resulting in undesirable data entry. Even when the tablet-type input device is not in use, there is still a problem that has to be solved. That is, when the user is temporarily away from the computer, another person may operate the computer mistakenly or maliciously, and no measure is taken in the prior art to cope with this situation. In conclusion, it is a common occurrence that wrong or undesirable data will be entered due to the improper use of the keyboard. This is one of the factors underlying the undesirable operation of the computer.

BRIEF SUMMARY OF THE INVENTION

Accordingly, an object of the present invention is to provide a computer system which comprises a tablet-type input device and inhibits an input operation from a keyboard when the tablet-type input device is in use.

The present invention has been developed in an effort to attain this object. According to the first aspect of the invention, there is provided a portable computer comprising: a keyboard having a plurality of keys; a tablet-type input device for entering coordinate data; a display, being integral with the tablet-type input device, for displaying data; and means for inhibiting a key input operation from the keyboard while a predetermined key of the keyboard is kept depressed.

According to the second aspect of the present invention, there is provided a portable computer comprising: a keyboard unit for entering key data; a coordinate input device for entering coordinate data; a switch, arranged near the coordinate input device, for generating a control signal based on which a key input operation from the keyboard unit is inhibited; and means, connected to the switch, for inhibiting the key input operation from the keyboard unit in response to an operation of turning on the switch.

In regard to the second aspect, it should be noted that the key input operation from the keyboard unit is inhibited while a predetermined key of the keyboard unit is kept depressed. Even when data are entered by means of a pen and a tablet in a train or in a place where there is no table, erroneous data entry is inhibited. In other words, reliable data entry is ensured even when a key of the keyboard is touched by a hand of the user. When the predetermined key is depressed and the switch is turned on, the system is kept in the operable state, but the input operation from the keyboard is inhibited. This feature is very advantageous when the user is temporarily away from the system. Since the keyboard cannot be operated in the meantime, undesirable data entry is reliably prevented.

According to the third aspect of the present invention, there is provided a portable computer comprising: a keyboard unit for entering key data; a coordinate input device for entering coordinate data; a display panel which is integral with the coordinate input device and which is rotatable between an open state and a closed state with reference to the main body of the portable computer; an angle/position sensor for sensing a predetermined angle/position when the display panel is changed from the closed state to the open state; and keyboard control means, connected to the angle/position sensor, for inhibiting a key input operation from the keyboard unit in response to the predetermined angle/position sensed by means of the angle/position sensor.

In regard to the third aspect, it should be noted that the key input operation from the keyboard is inhibited when the display panel is open. When data are entered by means of the pen and the tablet, the display panel is rotated so that it forms a predetermined angle (e.g., 180°) with reference to the main body of the computer. In association with this rotation of the display panel, the key input operation from the keyboard is inhibited. In other words, the inhibition of the key input operation is enabled without requiring any particular operation.

According to the fourth aspect of the present invention, there is provided a portable computer comprising: a keyboard unit for entering key data; a coordinate input device for entering coordinate data; a display panel which is integral with the coordinate input device and which is rotatable with reference to the main body of the portable computer; sensing means, incorporated in the main body of the portable apparatus, for sensing whether or not the main body of the portable computer is inclined more than a predetermined angle; and a keyboard controller, connected to the sensing means, for inhibiting a key input operation from the keyboard in response to a sensing operation by the sensing means.

In regard to the fourth aspect, the key input operation from the keyboard is inhibited on the basis of the sensing of the angle at which the main body of the computer is inclined. If the tablet is not placed on a desk but held by hand when the user enters data, it is very likely that erroneous data entry will occur. To prevent this problem, the key input operation from the keyboard is prevented when the main body of the computer is inclined more than a predetermined angle.

The present invention can provide a computer system which employs a keyboard as a data input device, and which inhibits the input operation from the keyboard when this keyboard is not used for data entry.

Where a tablet-type input device is employed, the use of the keyboard is prevented, and erroneous data entry therefrom can be prevented. Moreover, since the user can arbitrarily determine whether or not the input operation from the keyboard should be inhibited, improper use of the keyboard by a third party can be prevented. Accordingly, the data stored in the computer can be reliably protected. In particular, when the tablet-type input device is used in combination of the portable computer, the input operation from the keyboard is inhibited. Hence, a reliable data entry operation is thus ensured.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 is a perspective view showing the outward appearance of the personal computer of the embodiment;

FIG. 5 is a diagram illustrating the technical concepts underlying the present invention;

DETAILED DESCRIPTION OF THE INVENTION

An embodiment of the present invention will now be described with reference to the accompanying drawings.

Figure 1:
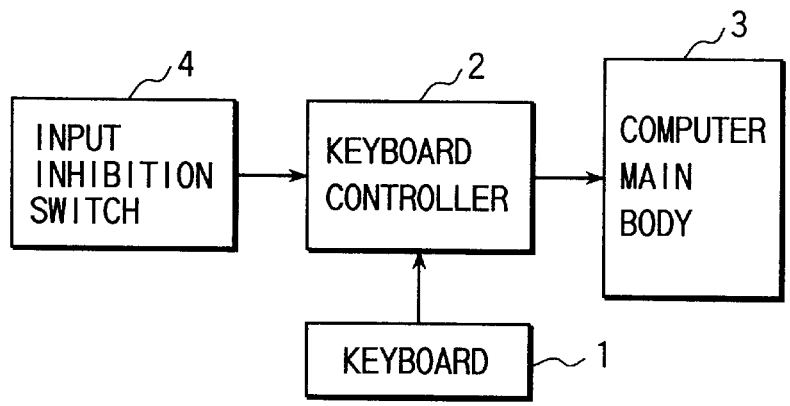
FIG. 1 is a block circuit diagram according to one embodiment of the present invention.
Figure 2:
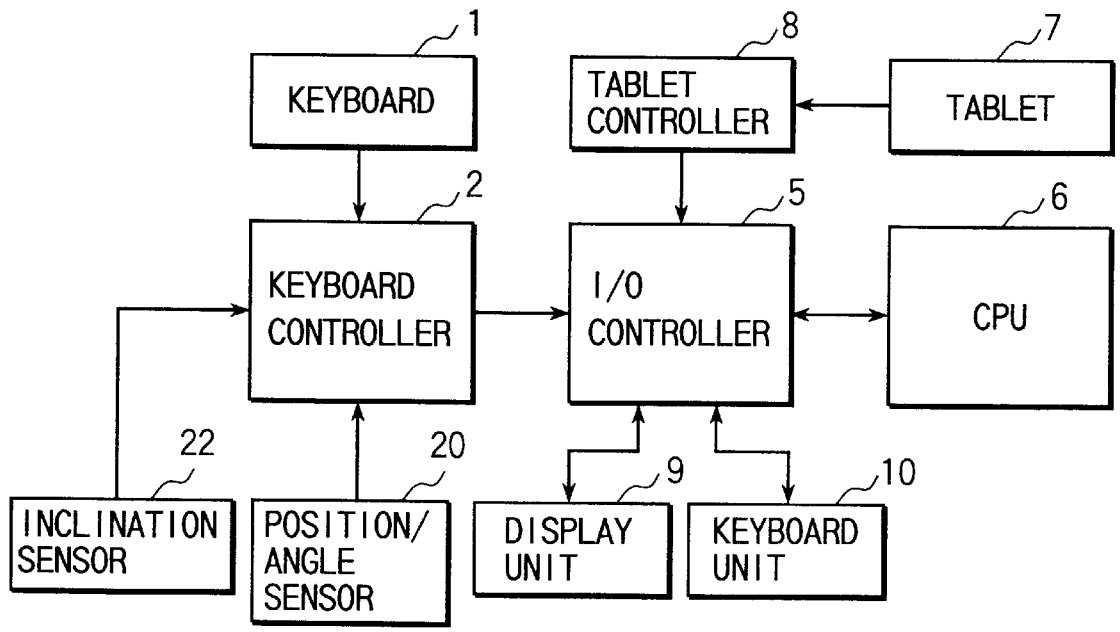
FIG. 2 is a block circuit diagram showing the major portion of the personal computer according to the embodiment.
Figure 4:
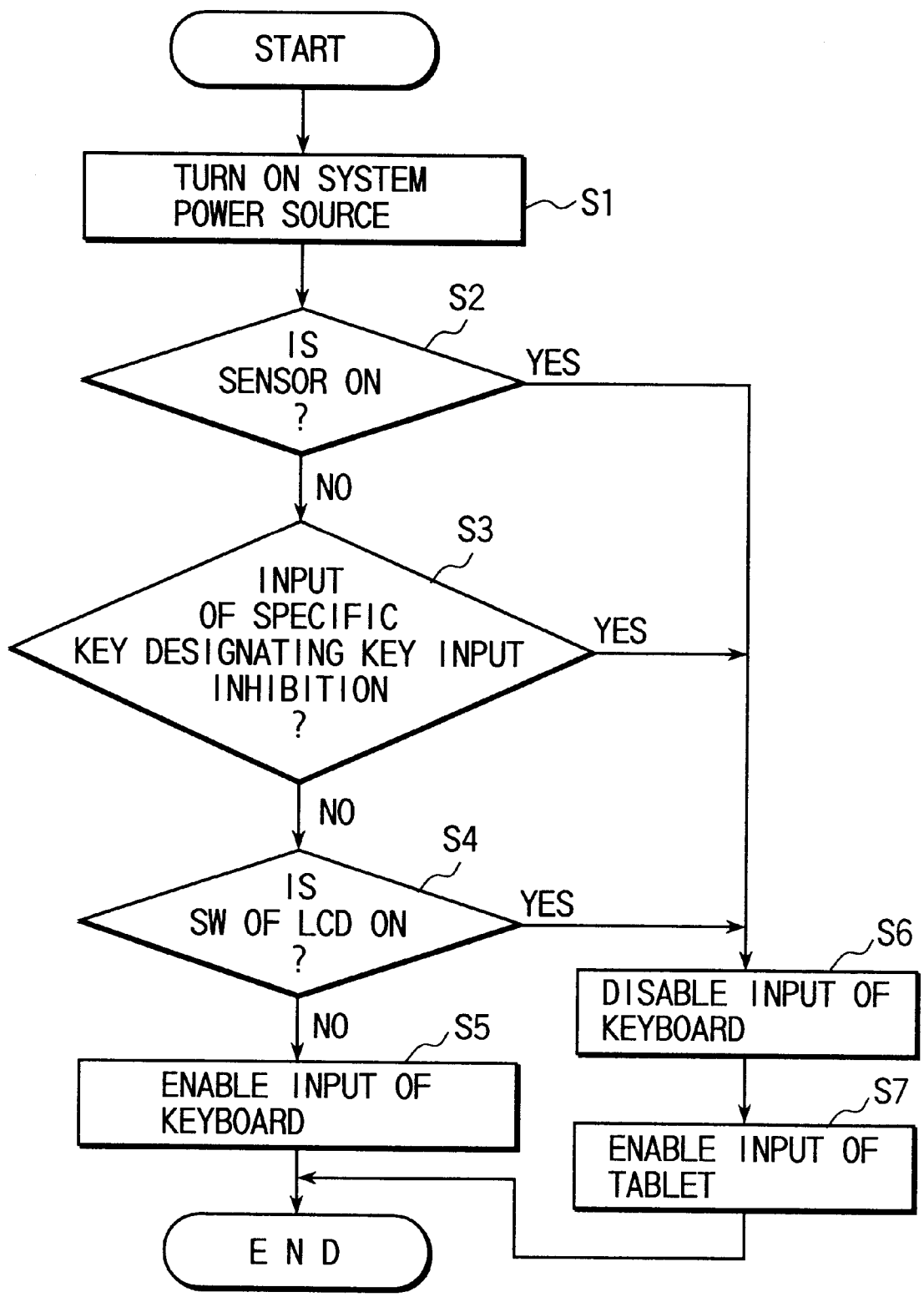
FIG. 4 is a flowchart for explaining the operation of the embodiment.

FIG. 1 is a block circuit diagram according to one embodiment of the present invention, FIG. 2 is a block circuit diagram showing the major portion of the personal computer according to the embodiment, FIG. 3 is a perspective view showing the outward appearance of the personal computer of the embodiment, and FIG. 4 is a flowchart for explaining the operation of the embodiment.
(System Configuration)

An embodiment described below pertains to a system which is designed for application to a portable personal computer and which employs a keyboard 1 as a data input device. As shown in FIG. 1, the subject system comprises a keyboard controller 2 for converting a key input operation from the keyboard into input data and supplying the resultant data to a computer main body 3.

The subject system also comprises an input inhibiting switch 4 for inhibiting a key input operation from the keyboard 1. The keyboard controller 2 has a function of rendering data entry (which corresponds to a key input operation from the keyboard 1) ineffective, in response to a control signal supplied from the input inhibiting switch 4. To be more specific, even when a key input operation is performed from the keyboard 1, the corresponding input data (i.e., scanned codes) are inhibited from being supplied to the computer main body 3.

As mentioned below, the input inhibiting switch 4 is actually a specific key 14 provided on the keyboard 1, sensors 20 and 22 for sensing the enabled state of the tablet-type input device, or a specific key 30 provided on the display device. Specific examples in which the present invention is embodied will be described.
(Personal Computer Employed in the Embodiment)

As shown in FIGS. 2 and 3, the embodiment is designed on the assumption that a portable computer is used, and not only a keyboard 1 but also a tablet-type input device is employed as a data input device. The tablet-type input device is made up of a tablet 7 (e.g., a pen) for sensing a coordinate position, and a tablet controller 8 for converting the coordinate position into input data.

The computer main body 3 comprises an input/output controller 5, and transfers data entered from either the keyboard controller 2 or the tablet controller 8 to a microprocessor (CPU) 6. Under the control of the CPU 6, the input/output controller 5 controls the output operation of a display device 9 and the input/output operation of a storage device 10.

As shown in FIG. 3, the keyboard 1 is provided for the main body of the personal computer. The CPU 6, the input/output controller 5, the keyboard controller 2, the tablet controller 8, the position/angle sensor 20 and the inclination sensor 22, all of which are shown in FIG. 2, are incorporated inside the computer main body 3. The portable computer also comprises a display panel (display screen) 11 made up of an LCD. It is rotatably coupled to the computer main body 3 by means of a hinge mechanism 12. In FIG. 3, the display device 9 is depicted as being in the open state.

The portable computer is of a structure wherein the display panel 11 of the display device is integral with the tablet 7. When the user touches the display panel 11 with a pen, the coordinate position touched with the pen is converted into input data, and this input data is supplied to the input/output controller 5.
(Input Inhibiting Operation from the Keyboard)

A description will now be given as to how the function of inhibiting an input operation from the keyboard 1 is realized in the portable computer of the embodiment.

Figure 7:
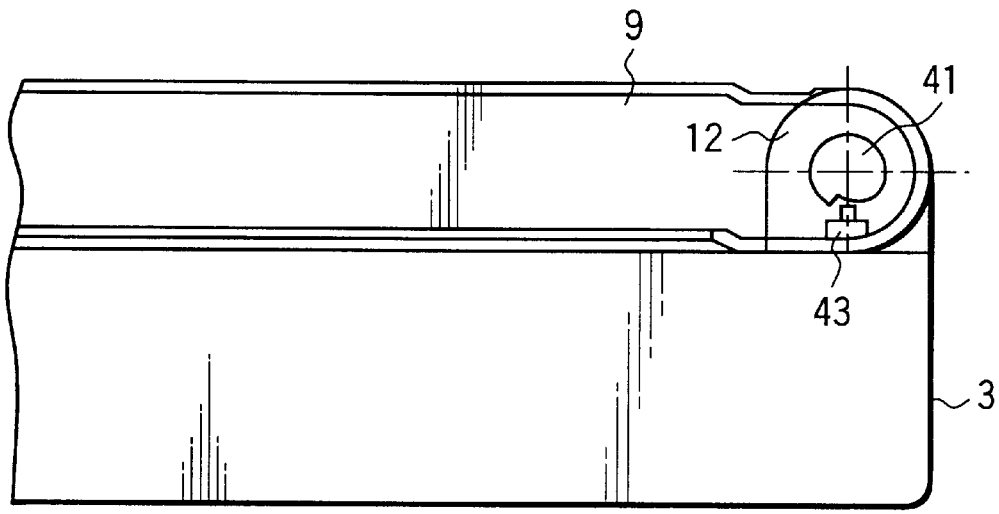
FIG. 7 is a detailed view showing how the sensor 20 in FIG. 2 is when the display device is in the closed state.
Figure 8:
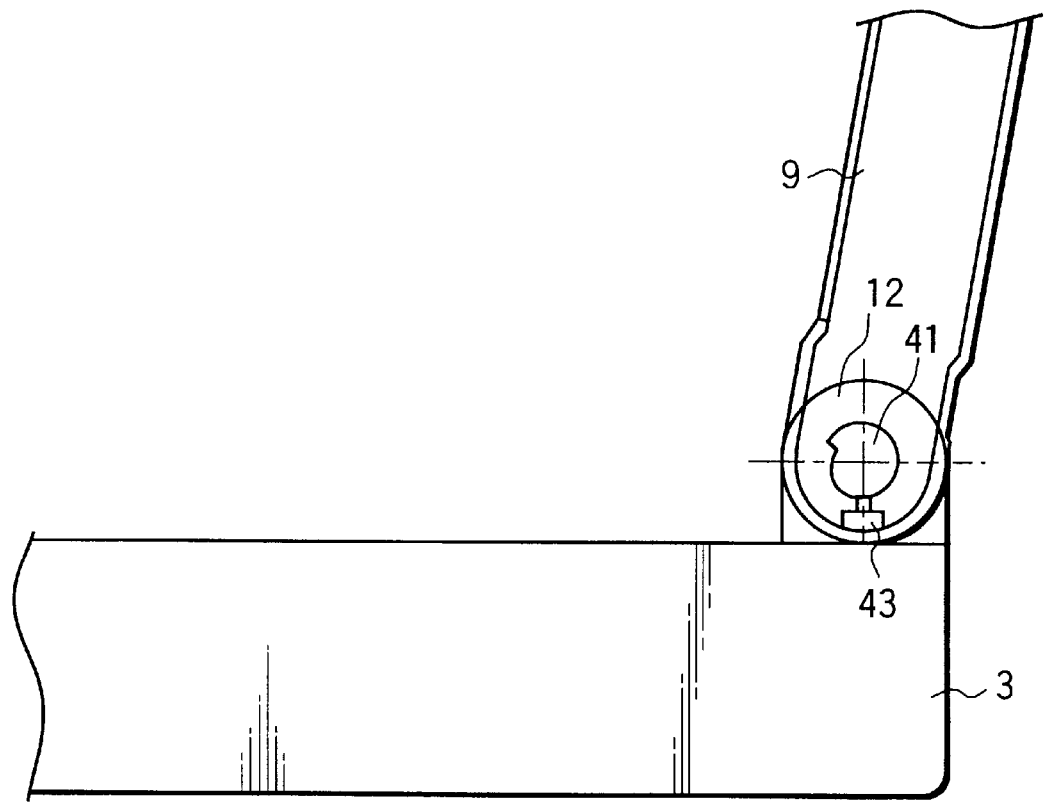
FIG. 8 is a detailed view showing how the sensor is when the display device is in the open state.

One of the specific ways for realizing this function is to provide a sensor 20 inside the computer main body 3. The sensor 20 serves as an input inhibiting switch 4 and senses the angle of the display device 9 rotated by means of the hinge mechanism 12. As shown in FIG. 7, the sensor 20 is made up of a shaft 41 and a microswitch 43, both arranged inside the interior of the hinge mechanism 12 of the display device 9. The shaft 41 is shaped like an eccentric cylinder. When the display device 9 is opened, the microswitch 43 is turned off after being gradually pushed. Upon sensing of the predetermined angle of the display device 9, the sensor 20 outputs a sensing signal to the keyboard controller 2. On the basis of this sensing signal, the keyboard controller 2 inhibits the input operation from the keyboard 1.

As shown in FIG. 3, when the user rotates the display device 9 into the open state shown in FIG. 3, this state of the display device 9 is sensed by the sensor 20. In other words, when the display device 9 is in the open state, the use of the tablet-type input device, which employs the tablet 7 integral with the display panel 11, is enabled in preference to the keyboard 1. Therefore, the keyboard controller 2 inhibits the input operation from the keyboard 1 on the basis of the sensing signal supplied from the sensor 20. To be specific, the key code data from the keyboard 1 are not supplied to the input/output controller 5. The inhibition of the supply of the key code data is realized by providing a gate circuit, for example. Since the input operation from the keyboard 1 is inhibited as long as the tablet-type input device is used, it does not matter even if a finger of the user touches the keyboard 1 during the data entry from the tablet-type input device. In this specific example, it is desired that an appropriate means be employed to release the inhibition of the input operation from the keyboard 1. For example, it is preferable to assign an inhibition-releasing function to one of the keys of the keyboard 1. When the user operates a key assigned with the function, the keyboard is rendered operative, and data entry from the keyboard 1 is thus enabled.

In the specific example mentioned above, one eccentric shaft 41 and one switch 43 are combined together. However, this structure in no way restricts the present invention. For example, a plurality of combinations, each made up of an eccentric shaft and a switch, may be provided so as to sense different angles of the display device 9. If this alternative structure is employed, fine control of the sensing of the angle of the display device 9 is enabled. Therefore, the user is allowed to arbitrarily determine the tilt angle of the display device 9 in relation to the inhibition of the key input operation.

In the second specific example, a specific key (e.g., a shift key) 14 of the keyboard 1 is used as an input inhibiting switch 4. To inhibit the input operation from the keyboard 1, the user operates the tablet 7 while pressing the specific key 14. As long as the tablet 7 is pressed in this manner, the keyboard controller 2 inhibits the input operation from the keyboard 1.

Since, therefore, the input operation from the keyboard 1 is kept inhibited when data are entered from the tablet 7, improper data entry, which may occur if a hand of the user touches the keyboard 1, is reliably prevented.

The input inhibiting switch 4 need not be one of the keys originally provided for the keyboard 1, such as a shift key. A key exclusively used for inhibiting the input operation from the keyboard may be provided on the keyboard 1.

In the third specific example, a specific switch 30 is provided in the neighborhood of the display panel 11 of the display device 9 and used as an input inhibiting switch 4. When data are entered by use of the tablet-type input device, the user operates the specific switch 30, thereby inhibiting the input operation from the keyboard. Since, in this manner, the input operation from the keyboard is inhibited when the tablet-type input device is in use, improper entry of data is prevented even if the user's hand touches the keyboard 1.

According to the third specific example, the user can arbitrarily inhibit the input operation from the keyboard 1 independently of the operation of the tablet-type input device, and this is simply a matter of operating the specific switch 30. As in the second specific example, the third specific example is advantageous in that the operation of the keyboard by a third party is inhibited when the user is temporarily away from the system, so that undesirable data entry is reliably prevented.

According to the fourth specific example, an inclination sensor 22 (FIG. 2) is provided inside the computer main body 3 and used as the input inhibiting switch 4. In FIG. 2, both the position/angle sensor 20 and the inclination sensor 22 are depicted for simplicity, but either one of them may be provided. The inclination sensor can be fabricated based on the conventional art. For example, it may be designed to output a sensing signal to the keyboard controller 2 when the computer main body 3 is inclined more than a predetermined angle. In response to the sensing signal supplied from the inclination sensor, the keyboard controller 2 inhibits the input operation from the keyboard. With this structure, when data are entered by use of the tablet-type input device during conveyance of the computer main body 3, the user can inhibit the input operation from the keyboard. In the case of the portable computer, it is placed on a desk or another horizontal flat object, and the keyboard 1 is operated, with the computer main body 3 kept in the horizontal state. On the other hand, when the computer main body 3 is carried and data are entered in a train or a space where there is no desk or table, the tablet-type input device is often used. In this case, the inclination of the computer main body 3 is sensed so as to determine whether or not the environment is suitable for use of the computer. If the environment is not suitable, the input operation from the keyboard 1 is inhibited. Since an erroneous operation from the keyboard 1 is thereby prevented beforehand, improper or undesirable data is prevented from being entered from the keyboard 1.

To sense the lifted state of the computer main body, a microswitch may be employed in addition to the inclination sensor 22. This microswitch is provided on the bottom of the computer main body, for example. When the computer main body is lifted off the desk or the lap of the user, the microswitch is turned on, and a sensing signal indicative of the lifted state of the computer is output. With this structure, data entry from a pen is enabled when the computer main body is held by hand, and data entry from the keyboard is enabled when it is placed on the desk or the lap.

FIG. 4 is a flowchart showing how an input operation from the keyboard 1 is inhibited. The inhibition of the input operation is illustrated, referring to the case where a portable computer provided with the functions explained in the first, second and third specific examples is used.

Referring to the flowchart in FIG. 4, when the sensor for sensing the inclination of the display device 9 is turned on in the state where the system power source of the computer is ON, the keyboard controller 2 inhibits an input operation from the keyboard 1 (Steps S1, S2 and S6). At the time, the tablet-type input device of the portable computer can be used for entering data (Step S7). As mentioned above, however, it is preferable to provide a switch means for releasing the inhibition of the input operation from the keyboard 1.

In addition, the keyboard controller 2 inhibits an input operation from the keyboard if the specific key 14 of the keyboard 1 or the specific switch 30 of the display device 9 is operated (Steps S3, S4 and S6). At the time, the tablet-type input device of the portable computer can be used for entering data (Step S7). Where none of the above operations are performed, data entry from both the keyboard and the tablet-type input device is enabled (Step S5).

As mentioned above, according to the present invention, a portable computer has a function of inhibiting an input operation from the keyboard 1 in response to an operation of the input inhibiting switch 4. In the case where data input operation from the keyboard 1 is not required, the keyboard is rendered inoperative, and undesirable data entry due to the improper operation of the keyboard is prevented thereby. If the specific examples of the above embodiment are selectively combined, the input operation from the keyboard 1 can be inhibited in accordance with the environment in which the computer is used or the environment in which an operation intended by the user is performed.

Figure 6:
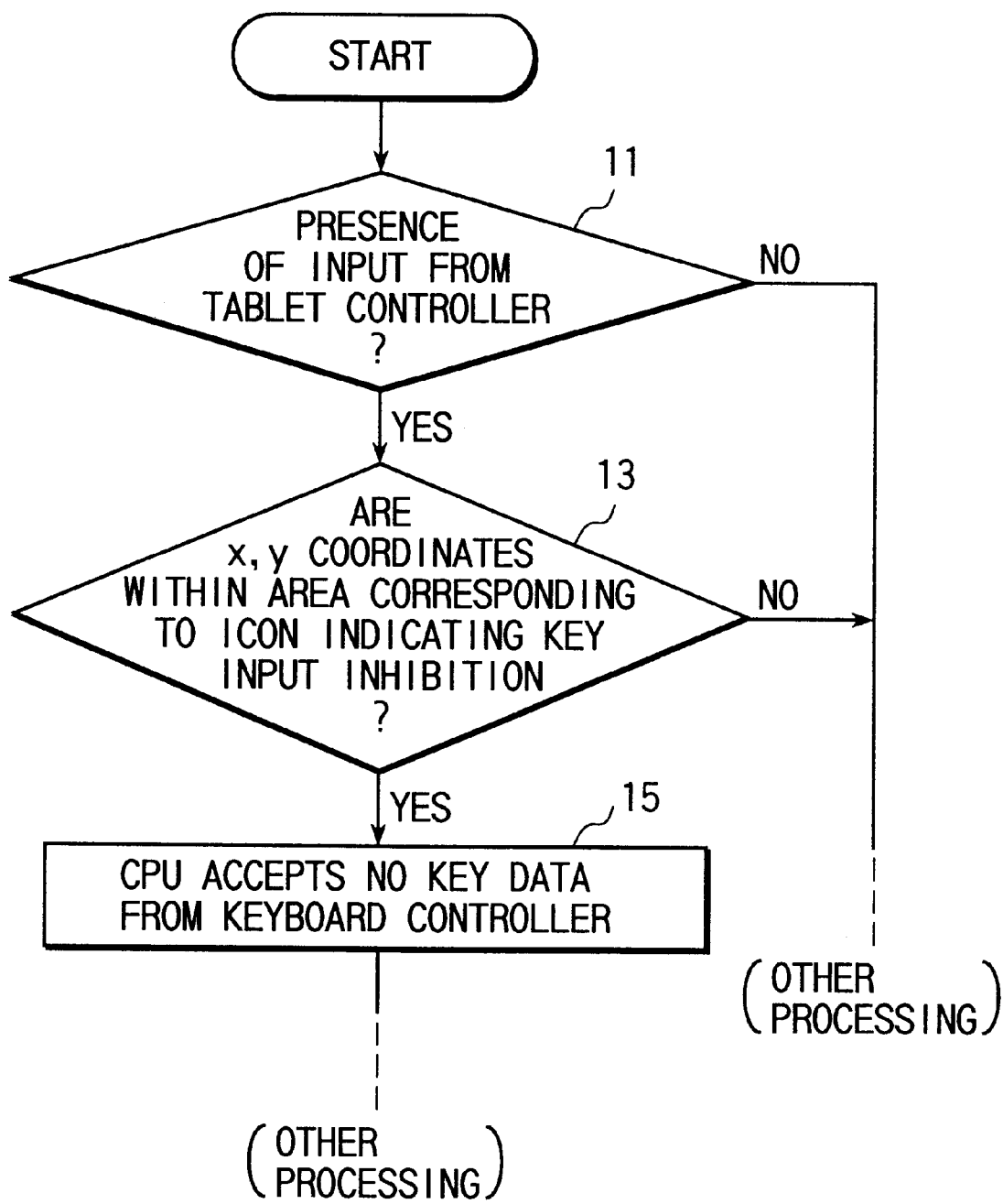
FIG. 6 is a flowchart showing how the CPU operates in the embodiment of the present invention.

FIGS. 5 and 6 show another embodiment of the present invention. As shown in FIG. 5, an icon indicative of the inhibition of key input may be displayed on the screen of the display device 9 (the icon may be replaced with a button, a mark, an illustration, a character, or the like), and the user touches that icon with a pen or clicks it with a mouse or the like. As a result, the coordinate position data corresponding to the icon is supplied to the CPU 6. In Step S11 shown in FIG. 6, the CPU 6 determines whether coordinate data is input from the tablet 7. When it is determined that the coordinate data is input, a check is made in Step S13 to see whether the x and y coordinate values of the input data represent a position within the icon. If it is determined in step S13 that a position within the icon, the CPU 6 rejects the key data supplied from the keyboard controller 2. Accordingly, the key input operation from the keyboard is inhibited.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

I claim:

1. A portable computer comprising:

a keyboard unit for a key input operation;

a coordinate input device for entering coordinate data;

a display panel being integral with the coordinate input device and movable between an open state and a closed state with reference to a main body of the portable computer;

an angle/position sensor for sensing a predetermined angle/position of the display panel; and keyboard control means, connected to the angle/position sensor, for inhibiting the key input operation from the keyboard unit in response to sensing of the predetermined angle/position by means of the angle/position sensor.

* * * * *